(12) United States Patent
Haselmann

(10) Patent No.: US 12,343,904 B2
(45) Date of Patent: Jul. 1, 2025

(54) FEEDING DEVICE FOR FEEDING FLUFF AND GRANULES INTO AN EXTRUDER

(71) Applicant: WINDMÖLLER & HÖLSCHER KG, Lengerich (DE)

(72) Inventor: Simon Haselmann, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 0 days.

(21) Appl. No.: 17/768,336

(22) PCT Filed: Oct. 14, 2020

(86) PCT No.: PCT/EP2020/078832
§ 371 (c)(1),
(2) Date: Apr. 12, 2022

(87) PCT Pub. No.: WO2021/074184
PCT Pub. Date: Apr. 22, 2021

(65) Prior Publication Data
US 2024/0140013 A1    May 2, 2024

(30) Foreign Application Priority Data

Oct. 17, 2019    (DE) ..................... 10 2019 216 053.0

(51) Int. Cl.
*B29B 7/60* (2006.01)
*B29B 7/66* (2006.01)
(Continued)

(52) U.S. Cl.
CPC ................ *B29B 7/603* (2013.01); *B29B 7/60* (2013.01); *B29B 7/66* (2013.01); *B29B 7/905* (2013.01);
(Continued)

(58) Field of Classification Search
CPC ... B29B 7/60; B29B 48/288; B01F 35/71775; B01F 35/7173; B01F 35/71731
See application file for complete search history.

(56) References Cited

U.S. PATENT DOCUMENTS 3,597,850 A  *  8/1971  Jenkins ................. F26B 17/128
                                                                34/361
9,227,344 B2 *  1/2016  Schmalholz ............ B29C 48/39

FOREIGN PATENT DOCUMENTS

DE            241530       12/1986
DE           10214654      10/2003
(Continued)

OTHER PUBLICATIONS

KWS, Screw Conveyors, Aug. 1, 2016 (Year: 2016).*
Hewitt, Powder Build-up in Detergent Packing Lines, University of Birmingham, Jan. 23, 2015 (Year: 2015).*

*Primary Examiner* — Benjamin A Schiffman
(74) *Attorney, Agent, or Firm* — Jacobson Holman PLLC

(57) ABSTRACT

A feeding device for feeding fluff and granules into an extruder includes a supplying apparatus with an outlet-side pipe piece for the granules, with which the granules can be fed while forming a granule column, the pipe piece being connected to an inlet opening of the extruder, a funnel with a funnel outlet for supplying fluff, an auger being provided within the funnel for conveying fluff, which projects through the funnel outlet and into the pipe piece, the fluff being conveyable within the granule column, and the auger being configured to be a double-start and so as to also convey parts of the granules and/or to compact the fluff with a compacting device.

5 Claims, 5 Drawing Sheets

(51) Int. Cl.
    *B29B 7/90*         (2006.01)
    *B29C 48/25*        (2019.01)
    *B29C 48/285*      (2019.01)
    *B29K 105/26*      (2006.01)

(52) U.S. Cl.
    CPC ...... *B29C 48/2563* (2019.02); *B29C 48/2567* (2019.02); *B29C 48/287* (2019.02); *B29C 48/288* (2019.02); *B29C 48/2886* (2019.02); *B29C 48/297* (2019.02); *B29K 2105/26* (2013.01)

(56) References Cited

FOREIGN PATENT DOCUMENTS

| | | |
|---|---|---|
| EP | 2828058 | 1/2019 |
| JP | S49136869 | 11/1974 |
| JP | H11192618 | 7/1999 |
| JP | 2001301009 | 10/2001 |
| WO | 2013126933 | 9/2013 |

* cited by examiner

PRIOR ART

FEEDING DEVICE FOR FEEDING FLUFF AND GRANULES INTO AN EXTRUDER

BACKGROUND OF THE INVENTION

1. Field of the Invention

The invention relates to a feeding device and method for feeding fluff and granules into an extruder.

2. Description of Related Art

On many apparatuses for the production of film webs, in particular on apparatuses that constitute a casting roll extrusion system, strips accumulate that are formed by longitudinal section of the film web. The film web is, in particular, a plastic film web. Such strips are primarily edge strips, which constitute process-related waste. Such strips are first crushed within a crusher into small flakes, often called fluff, for feeding into an extruder. For feeding into the extruder, a feeding device is provided, which, however, feeds fresh granules at the same time, so that fluff and granules are melted together in the extruder and fed into the extrusion system as a plastic melt.

Because the flow of the melt is predetermined by the extrusion recipe, the portion of the fluff for producing the plastic melt can vary depending on the width of the edge strip. However, if the proportion of the fluff is too large, it may happen that the extruder is not filled properly. In particular, this can be due to an excessive amount of air carried into the extruder by the fluff. Ultimately, the film web can have a reduced or even unacceptable quality.

The problem of the present invention is therefore to propose a feeding device and a method so that the quality of the plastic melt and thus the film web produced therefrom remain within an acceptable range.

The problem is solved according to the invention by the features thereof as described herein. The dependent claims define other possible embodiments of the invention.

SUMMARY OF THE INVENTION

According to the present invention, a feeding device is provided for feeding fluff and granules into an extruder having a supplying apparatus with an outlet-side pipe piece for the granules, with which the granules can be fed while forming a granule column, wherein the pipe piece is connected to an inlet opening of the extruder, and having a funnel with a funnel outlet for supplying fluff, wherein an auger is provided within the funnel for conveying fluff, which projects through the funnel outlet and into the pipe piece, wherein the fluff is conveyable within the granule column. The invention is also characterized in that the auger is configured in order to also convey parts of the granules and/or to compact the fluff.

In known systems of the prior art, the granules are merely slipped into the extruder. In the present case, the granules are also pushed into the extruder at least partially by means of the auger. According to findings of the inventors, it had occurred in the prior art that the fluff-air mixture blocked the way for the granules into the extruder. Due to the fact that the auger now also actively conveys the granules, fresh granules arrive better at the extruder, so that the mixture ratio normally resulting from the ratio of the fluff supplied and the normally required granules also arrives at the extruder.

In addition or alternatively, it is provided according to the invention to compact the fluff with a compacting device so that air is displaced and so that, in this way, the ratio of granules to fluff in the extruder also has the necessary value.

In an advantageous embodiment of the invention, it is provided that a part of the end of the auger arranged within the pipe piece is wider than the funnel outlet. The funnel outlet substantially determines the region within the pipe piece in which fluff is conveyed. For example, if the funnel outlet is positioned in the center of or above the pipe section, the fluff flow is also centrally surrounded by the granule column. If the auger is now designed to be wider than the funnel outlet, the granule column also comes into contact with it, so that the granules are also conveyed by the auger.

In addition, or alternatively, it is advantageous when a granule conveying device is arranged above the funnel outlet. In other words, fresh granules can be fed into the funnel by means of a granule conveying device so that the granules mix before the reach of the auger, so that the air in the funnel does not interfere with the flow of the granules.

It is advantageous when the auger is designed to be at least double-start. An auger usually consists of a shaft around which a spiral coil is arranged. If the auger is now designed to be double-start, this means that a second coil is arranged around the shaft, wherein the two coils are nested inside one another. Similarly, an auger can be designed to be multi-start. Higher compaction of the fluff can be achieved by an at least double-start auger, because, with a single-start auger, too much compaction can cause mechanical damage, in particular to the coils. By distributing the resulting forces to two coils, such damage is avoided, and stronger compactions of the fluff can also be produced.

Furthermore, it is advantageous when a dust collecting device is provided for vacuuming dust out of the funnel. Extra dust can lead to a loss of quality of the film web because it is often not melted, so that the dust particles can turn up directly in the film. In order to prevent this, it was already known from the prior art to apply a slight overpressure that removes dust particles from the extruder. However, this favored the introduction of air or an air/dust mixture into the extruder. In order to avoid this, a dust collecting device operating with a vacuum can be provided, with which dust and also air can be removed from the funnel.

The above-mentioned problem is also solved by a method for feeding fluff and granules into an extruder, in which the granules are fed with a supplying apparatus having an outlet-side pipe piece while forming a granule column, wherein the pipe piece is connected to an inlet opening of the extruder, and in which fluff is supplied with a funnel outlet having a funnel outlet, wherein fluff is conveyed within the funnel with an auger, wherein the auger projects through the funnel outlet and into the pipe piece, wherein the fluff is conveyed within the granule column, characterized in that the auger also conveys parts of the granules and/or compacts the fluff.

This achieves the same advantages that have already been described above in connection with the feeding device according to the invention.

Particularly preferably, the feeding device according to the invention and the method according to the invention can be combined with a film machine, in which at least an extruder, an extrusion nozzle for extruding a plastic melt film, a cooling device for cooling the melt film and transferring said melt film into a film web, a cutting device for cutting off an edge strip from the film web, a crusher for producing fluff from the edge strip, and a feeding device for feeding fluff into the extruder are provided.

It is provided here that the feeding device is designed according to an embodiment described in this application.

BRIEF DESCRIPTION OF THE DRAWINGS

Further advantages, features, and details of the invention will be apparent from the following description, in which different exemplary embodiments are explained in detail with reference to the figures. The respective features mentioned in the claims and in the description can be essential to the invention individually or in any combination of mentioned features. Within the scope of the entire disclosure, features and details described in the context of the method according to the invention naturally also apply respectively in the context of the feeding device according to the invention and vice versa, so that mutual reference is or can always be made with respect to the disclosure of the individual aspects of the invention. Of course, features of individual exemplary embodiments shown in the figures can also be combined with exemplary embodiments of other figures. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
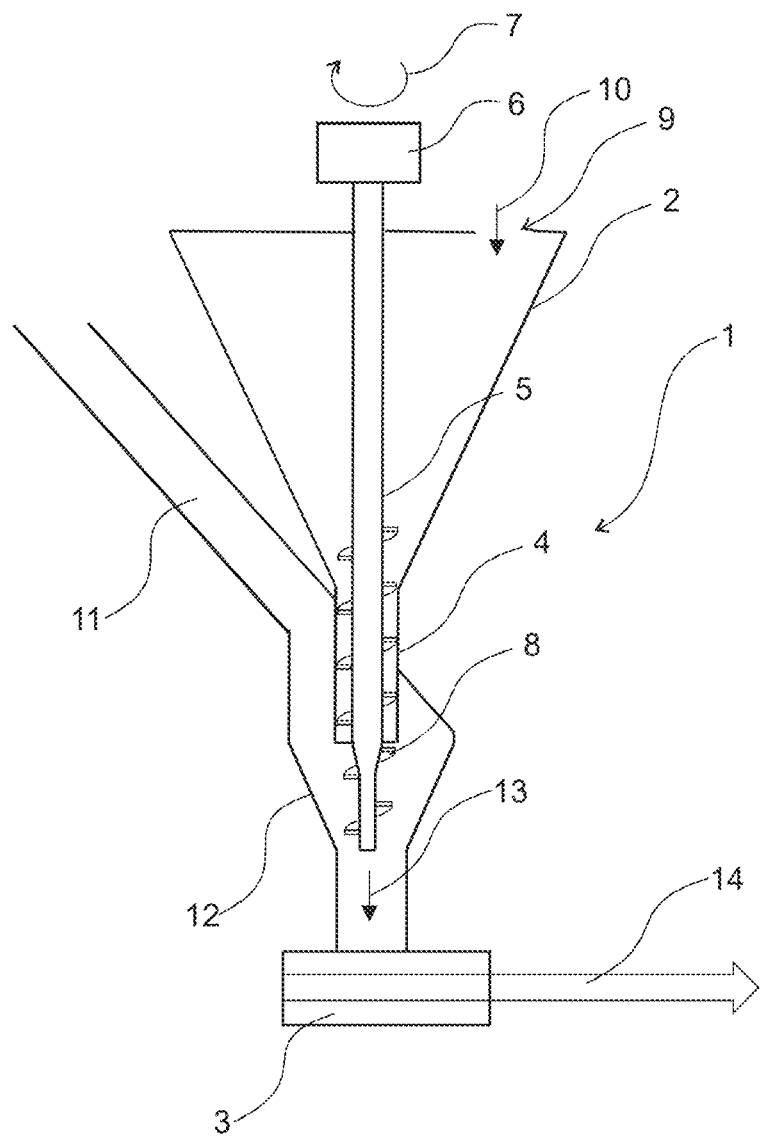
FIG. 1 A sectional view of a feeding device according to the prior art

FIG. 1 shows a feeding device 1 according to the prior art, comprising a funnel 2 that tapers in the direction of the extruder 3 and continues into the funnel outlet 4. Through the funnel 2 and the funnel outlet 4, an auger 5 projects, which, driven by the motor 6, rotates in the direction of the arrow 7. The auger comprises a coil 8, of which individual elements are visible in the sectional view. Fluff can be supplied to the funnel 2 through a supply opening 9 in the direction of the arrow 10. Fluff is not shown.

The fluff is conveyed through the funnel outlet 4 by the rotation of the auger.

Furthermore, a granule supplying device 11 is visible, which continues in a pipe piece 12. The auger continues up to this pipe piece 12, so that fluff is also conveyed into the granules. Granules and fluff enter the extruder 3 in the direction of arrow 13, are melted there, and enter a film machine along the arrow 14.

Figure 2:
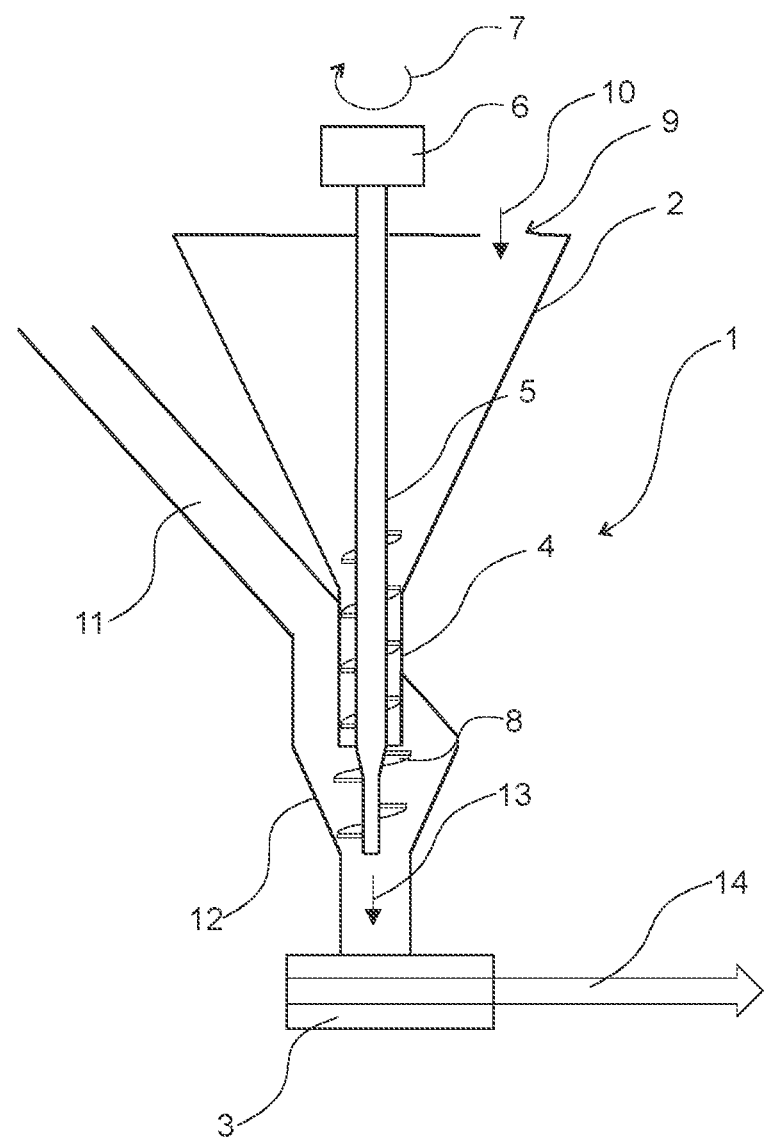
FIG. 2 A first embodiment of the invention

FIG. 2 shows a first embodiment of the invention, in which the coil 8 is designed to be wider below the funnel outlet 4 than inside the funnel outlet. As a result, not only fluff but also granules are conveyed by the auger directly below the funnel outlet.

Figure 3:
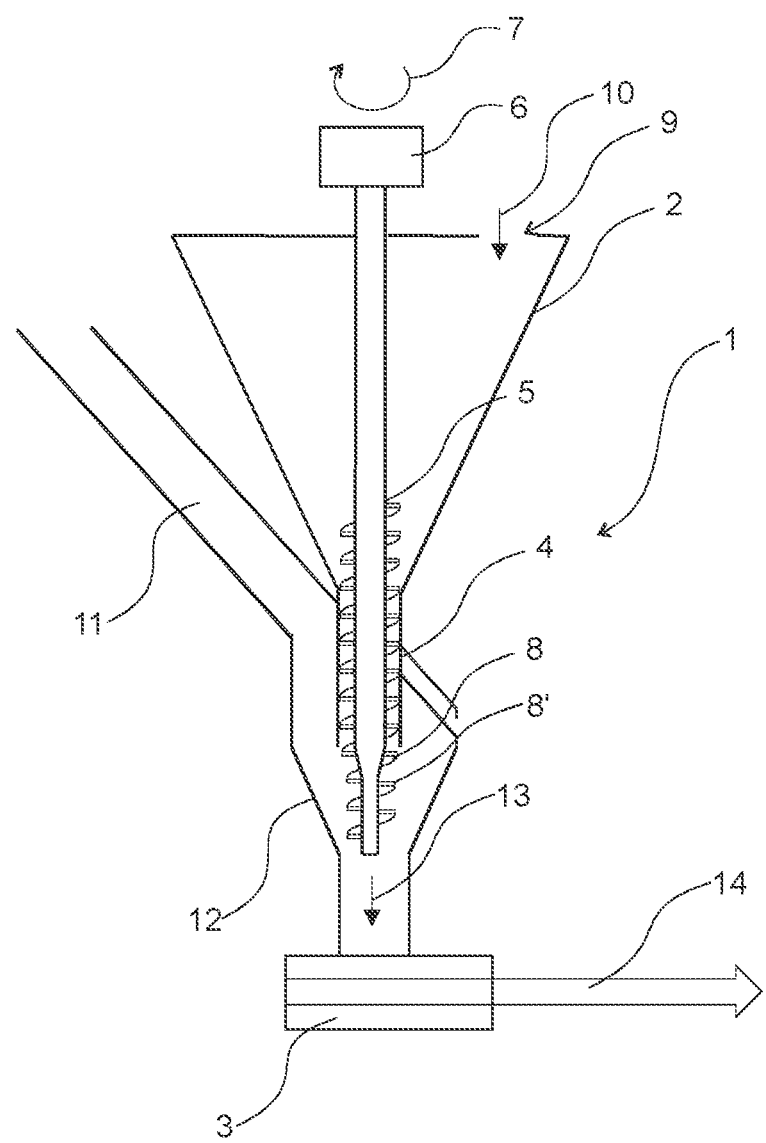
FIG. 3 A further embodiment of the invention

FIG. 3 shows a further embodiment of the invention, in which the auger 5 is designed to be double-start. This means that the auger comprises two coils 8 and 8'.

Figure 4:
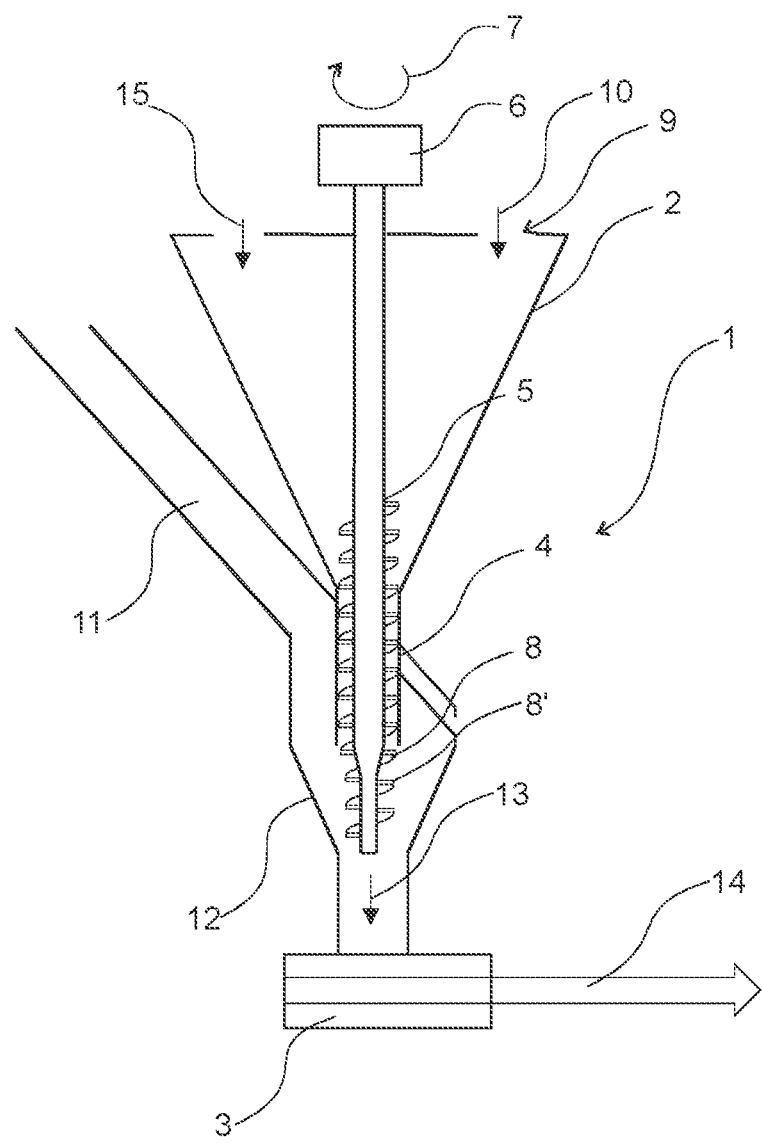
FIG. 4 A further embodiment of the invention

FIG. 4 shows a further embodiment of the invention, in which granules can also be fed to the funnel 2 in the direction of arrow 15. For example, the granules can enter the funnel via a branch of the granule conveying device, so that the granules can be supplied via two paths. However, it is also possible to supply further granules. Often, a plurality of different granules are supplied to an extruder in order to tailor the properties of a film or a layer within the film.

Figure 5:
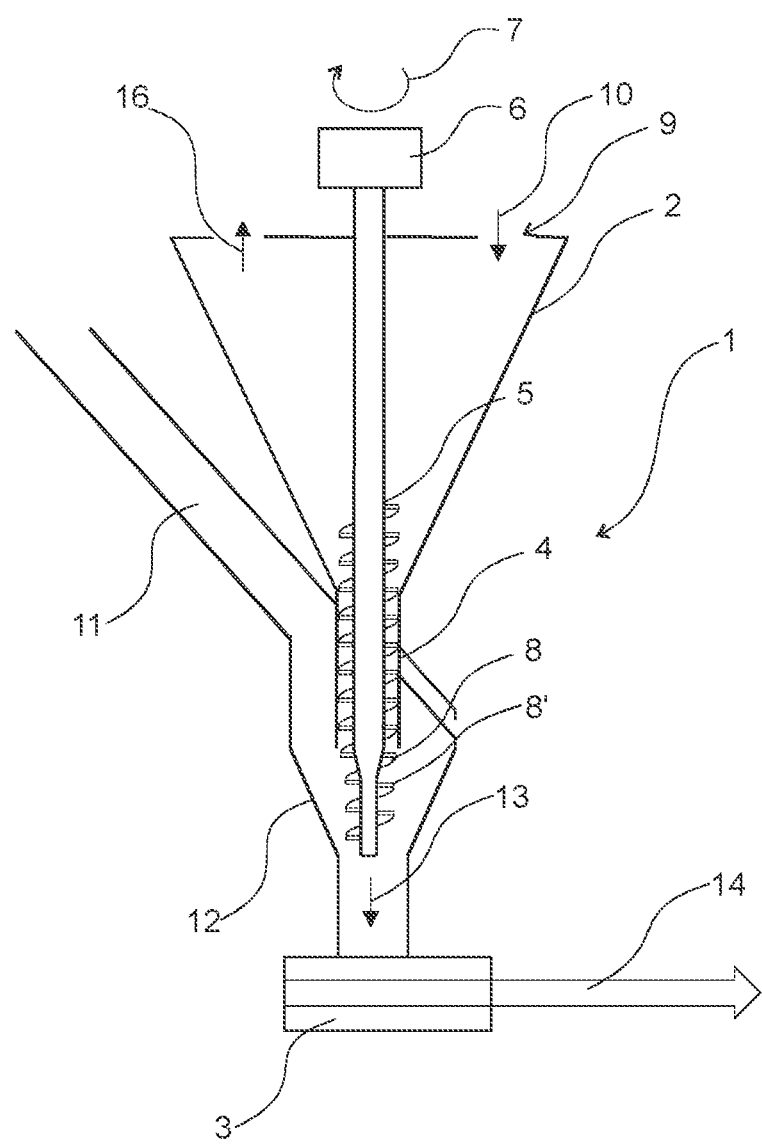
FIG. 5 A further embodiment of the invention

FIG. 5 shows a further embodiment of the invention in which a vacuum is applied to the funnel 2 so that air and/or dust can be sucked out of the funnel. This is indicated by arrow 16.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of Reference Numerals | |
|---|---|
| 1 | Feeding Device |
| 2 | Funnel |
| 3 | Extruder |
| 4 | Funnel Outlet |
| 5 | Auger |
| 6 | Motor |
| 7 | Arrow |
| 8 | Coil |
| 9 | Supply Opening |
| 10 | Arrow |
| 11 | Granule Supplying Device |
| 12 | Pipe Piece |
| 13 | Arrow |
| 14 | Arrow |
| 15 | Arrow |
| 16 | Arrow |
| 17 | |
| 18 | |
| 19 | |
| 20 | |
| 21 | |
| 22 | |
| 23 | |
| 24 | |

What is claimed is:

1. A feeding device for feeding fluff and granules into an extruder, said feeding device comprising:
   a supplying apparatus with an outlet-side pipe piece for the granules, with which the granules can be fed while forming a granule column, the pipe piece being connected to an inlet opening of the extruder; and
   a funnel with a funnel outlet for supplying the fluff, an auger being provided within the funnel for conveying the fluff, the auger projecting through the funnel outlet and into the pipe piece, the fluff being conveyable within the granule column,
   the auger including an auger first part that is disposed within the funnel, and an auger second part that is disposed within the pipe piece below the funnel outlet, with the auger second part having a width that is wider than the width of the funnel outlet so as to convey within the pipe piece parts of the granules and/or to compact the fluff by functioning as a compacting device.

2. The feeding device according to claim 1, further comprising a granule conveying device arranged above the funnel outlet.

3. The feeding device according to claim 1, further comprising a dust collecting device provided for vacuuming dust out of the funnel.

4. The feeding device according to claim 1, wherein the auger is configured to be at least a double-start auger.

5. A method for feeding fluff and granules into an extruder with the feeding device of claim 1, said method comprising:
   feeding the granules are fed with a supplying apparatus having an outlet-side pipe piece while forming a granule column, the pipe piece being connected to an inlet opening of the extruder, supplying the fluff being supplied with a funnel having a funnel outlet, the fluff being conveyed within the funnel with an auger, the auger projecting through the funnel outlet and into the pipe piece, the fluff being conveyed within the granule column, the auger also conveying parts of the granules and/or compacting the fluff.

* * * * *